(12) United States Patent
Burd et al.

(10) Patent No.: US 8,407,562 B2
(45) Date of Patent: Mar. 26, 2013

(54) SYSTEMS AND METHODS FOR COMPRESSING DATA IN NON-VOLATILE SEMICONDUCTOR MEMORY DRIVES

(75) Inventors: Gregory Burd, San Jose, CA (US); Xueshi Yang, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 289 days.

(21) Appl. No.: 12/872,455

(22) Filed: Aug. 31, 2010

(65) Prior Publication Data
US 2011/0055664 A1 Mar. 3, 2011

Related U.S. Application Data

(60) Provisional application No. 61/238,824, filed on Sep. 1, 2009.

(51) Int. Cl.
*G11C 29/00* (2006.01)

(52) U.S. Cl. ........................... 714/768; 711/113

(58) Field of Classification Search .................. 714/768; 711/113
See application file for complete search history.

(56) References Cited

U.S. PATENT DOCUMENTS
2009/0132760 A1* 5/2009 Flynn et al. .................. 711/113

FOREIGN PATENT DOCUMENTS
WO WO2008070173 6/2008

OTHER PUBLICATIONS
International Search Report and the Written Opinion of the International Searching Authority, PCT/US2010/047533, 72 pages.

* cited by examiner

*Primary Examiner* — Sam Rizk

(57) ABSTRACT

A non-volatile semiconductor memory (NVSM) storage system includes a NVSM drive interface configured to receive host data sectors (HDSs) from a host interface. A buffer managing module is configured to store the HDSs in a buffer. A compression module is configured to compress the HDSs to generate compressed HDSs of different lengths. A drive data sector (DDS) generating module is configured to add nuisance data to the compressed HDSs to generate DDSs. The DDSs are stored in NVSM.

20 Claims, 11 Drawing Sheets

SYSTEMS AND METHODS FOR COMPRESSING DATA IN NON-VOLATILE SEMICONDUCTOR MEMORY DRIVES

CROSS-REFERENCE TO RELATED APPLICATIONS

This application claims the benefit of U.S. Provisional Application No. 61/238,824, filed on Sep. 1, 2009. The disclosure of the above application is incorporated herein by reference in its entirety.

FIELD

The present disclosure relates to non-volatile semiconductor memory storage systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Non-volatile semiconductor memory (NVSM) has limited capacity and has a limited number of access events (i.e. life span of NVSM). An access event refers to an event when NVSM is written to, read from, or accessed to, for example, erase certain stored data. NVSM tends to degrade over time due to "wear and tear" experienced during access events. Increased frequency of access decreases the reliable operating life of NVSM.

Host data (user data) that is stored in NVSM is typically compressible. For this reason, host data is compressed to minimize storage space. Host data is also compressed to minimize the number of memory cells of the NVSM accessed during an access event. This reduces the number of access events per memory cell.

The host data is compressed by a host (e.g., a desktop, laptop or handheld computer) at a file system level. The compressed host data is provided to a NVSM drive as host data sectors. The NVSM drive stores the host data sectors in NVSM. The stored host data sectors are decompressed by the host to an original format when read from the NVSM drive.

SUMMARY

A non-volatile semiconductor memory (NVSM) storage system is provided and includes a NVSM drive interface configured to receive host data sectors (HDSs) from a host interface. A buffer managing module is configured to store the HDSs in a buffer. A compression module is configured to compress the HDSs to generate compressed HDSs of different lengths. A drive data sector (DDS) generating module is configured to add nuisance data to the compressed HDSs to generate DDSs. The DDSs are stored in NVSM.

In other features, the NVSM drive interface and the host interface are selected from a group comprising serial advanced technology attachment interfaces, small computer system interfaces, fiber channel interfaces, and universal serial bus interfaces.

In other features, the HDSs include a first HDS and a second HDS. One of the buffer managing module and the DDS generating module is configured to determine whether to combine the first HDS with the second HDS. The DDS generating module is configured to combine the first HDS and the second HDS to generate one of the DDSs.

In other features, the DDS generating module includes a combination determining module, a combiner module and a DDS building module. The combination determining module is configured to determine whether to combine a current HDS with stored HDSs and generate a combine signal. The combiner module is configured to combine the current HDS and the stored HDSs based on the combine signal. The DDS building module is configured to build one of the DDSs from a combination of the current HDS and the stored HDSs.

In other features, a method of operating a NVSM storage system is provided. The method includes receiving HDSs from a host interface via a NVSM drive interface. The HDSs are stored in a buffer. The HDSs are compressed to generate compressed HDSs of different lengths. Nuisance data is added to the compressed HDSs to generate DDSs. The DDSs are stored in NVSM.

In other features, the HDSs comprise a first HDS and a second HDS. The method further includes determining whether to combine the first HDS with the second HDS. The first HDS and the second HDS are combined to generate one of the DDSs.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
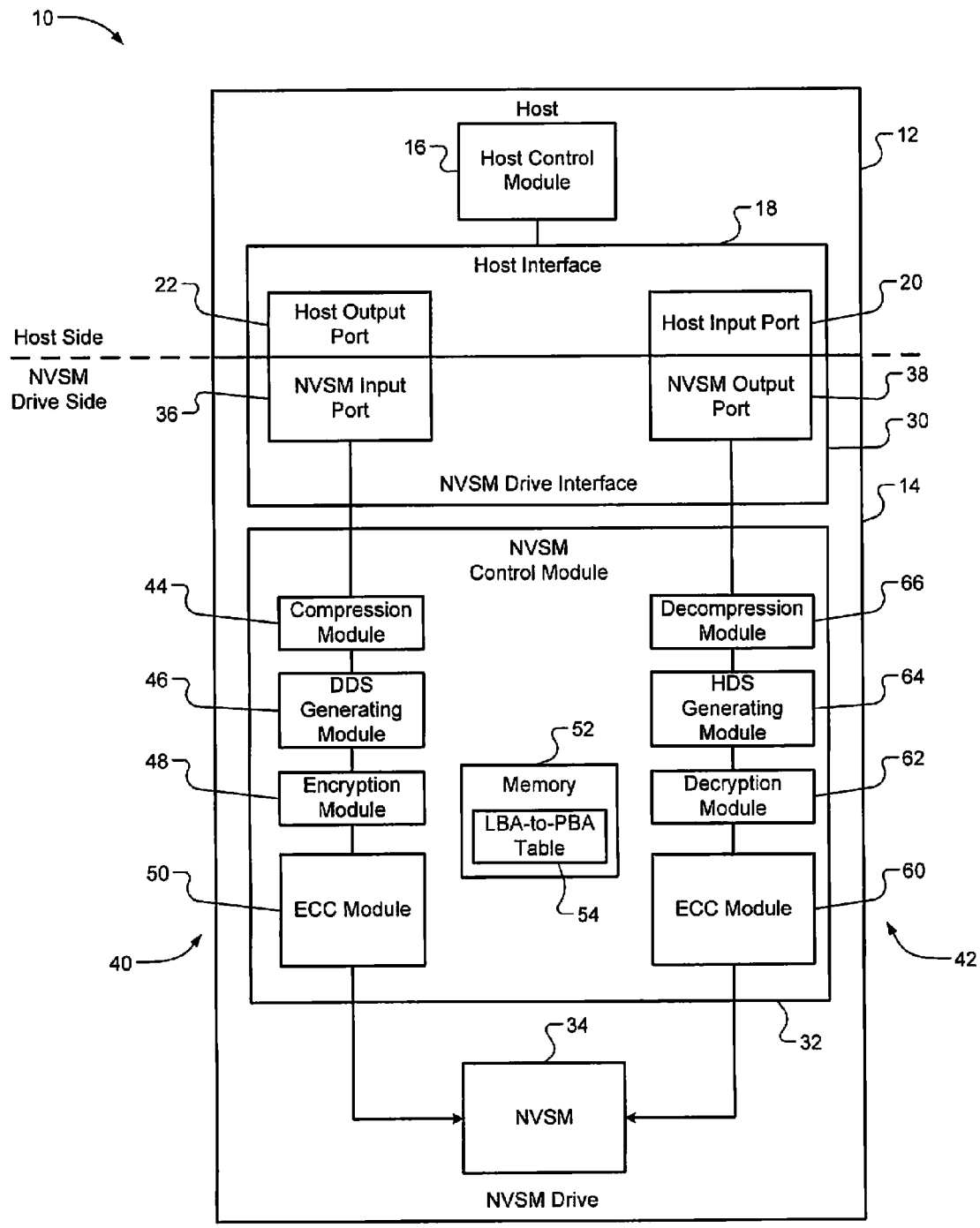
FIG. 1 is a functional block diagram of a first implementation of a non-volatile semiconductor memory (NVSM) storage system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In the following description, the term "non-volatile semiconductor memory (NVSM)" may refer to phase change memory (PCM), electrically erasable programmable read-only memory (EEPROM), read only memory (ROM) and/or random access memory (RAM). A couple of examples of EEPROM are NAND flash memory and NOR flash memory.

Also, in the following description the term "host" may refer to a device that transfers data to and/or accesses data from a NVSM drive. A NVSM drive may be a flash drive, a universal serial bus (USB) drive, a solid-state drive, etc.

As a few examples, a host may refer to a computer, a camera, a handheld device, a portable device, a cellular phone, a printer, a personal data assistant, an electronic note pad, a television, a display, an appliance, a monitoring system, etc. Examples of computers are a desktop computer, a laptop computer, an electronic note pad, etc. Examples of appliances are a washer, a dryer, a refrigerator, etc. A NVSM drive includes NVSM and may not include a rotating magnetic storage medium, such as a hard disk drive platter. Examples of monitoring systems include burglar monitors, smoke detection systems, baby monitors, etc.

In addition, various system elements, such as modules, network devices, and circuit components are disclosed herein. Examples of arrangements of the system elements are disclosed and include adjacent elements and non-adjacent elements. The adjacent elements are shown as being directly connected to each other. The non-adjacent elements are shown as being indirectly connected to each other.

As there are numerous implementations of the present disclosure, the arrangements do not explicitly show all of the implementations. For example, the adjacent and non-adjacent elements shown in FIGS. 1-8 may be directly or indirectly connected to each other. The adjacent and non-adjacent elements may wirelessly communicate with each other and/or may communicate with each other via wired links. The wireless communication may include Bluetooth devices and/or satisfy, for example, IEEE standards 802.11, 802.11a, 802.11b, 802.11g, 802.11h, 802.11n, 802.16, and 802.20.

Also, in the following description various modules are disclosed that have dual-state outputs. A first state may be "HIGH" and a second state may be "LOW". The HIGH and LOW states are provided as an example. The outputs may be modified for a particular condition to have the opposite state (e.g., LOW instead of HIGH).

In FIG. 1, a NVSM storage system 10 is shown. The NVSM storage system 10 includes a host 12 and a NVSM drive 14. The host 12 includes a host control module 16 and a host interface 18. The host interface 18 includes, for example, a host input port 20 and a host output port 22. The host interface 18 may be, for example, a serial advanced technology attachment (SATA) interface, a small computer system interface (SCSI), a serial-attached SCSI (SAS), a fiber channel interface, universal serial bus (USB) interface, etc. The host control module 16 transmits and receives host data to and from the NVSM drive 14 via the host interface 18. This may include read, write, and erase access events.

The NVSM drive 14 includes a NVSM drive interface 30, a NVSM control module 32, and NVSM 34. The NVSM drive interface 30 includes a NVSM input port 36 and a NVSM output port 38. The NVSM input port 36 communicates with the host output port 22. The NVSM output port 38 communicates with the host input port 20. The NVSM drive interface 30 may include additional input and output ports that communicate with the host interface 18. The NVSM drive interface 30 may be, for example, a SATA interface, a SCSI, a SAS, a fiber channel interface, a USB interface, etc.

The NVSM control module 32 includes receive path 40 and a transmit path 42. The receive path 40 includes a compression module 44, a drive data sector (DDS) generating module 46, an encryption module 48, and an error correction encoding (ECC) module 50. The compression module 44 may use lossy and/or lossless compression methods. Lossy compression and decompression provides data that is close but not the same as the original data after compression and decompression. Lossless compression and decompression provides reconstruction of the same data as the original after compression and decompression. Lossless data compression includes detecting repeating bit patterns and removing the redundancy.

The compression module 44 compresses host data sectors (HDSs) received from the host 12 when possible. The HDSs may be uncompressed, partially compressed, and/or fully compressed when received. An HDS may be the smallest length data element that is transmitted from the host 12 to the NVSM drive 14. Certain HDSs may not be compressible, for example, when lossless compression is used and a corresponding data pattern does not include redundancy.

The DDS generating module 46 combines compressed HDSs prior to storage in the NVSM 34. The HDSs may have uniform lengths prior to compression. The DDSs may be larger than the HDSs. For example, an HDS may be 512 bytes (B), where as a DDS may be 4 kilobytes (KB). HDSs and DDSs may have other lengths. Since the DDSs are larger than the HDSs, several HDSs may be combined to form a single DDS. Compressed HDSs may be, for example, concatenated and combined with HDS identification information to form a single DDS. The HDS identification information may include, for example, HDS bit lengths (i.e. number of bits in a HDS), number of HDSs, logical block addresses (LBAs), nuisance data, etc. Each HDS may have a unique LBA. Examples of formats are described below and are shown in FIGS. 9-12.

Nuisance data refers to data that is added to one or more HDSs such that a generated DDS is of a predetermined bit length. The DDS generating module 46 may generate each DDS to have the same bit length. Compressed HDSs may have different bit lengths. Different amounts of nuisance data is added to combine compressed HDSs to generate DDSs of equal length. The NVSM control module 32 prevents an HDS from being split between two DDSs by adding the nuisance data. Instead of storing portions of a HDS with two or more other HDSs, nuisance data is attached. The nuisance data may include, for example, all 0's, all 1's, null states, and/or redundant data to minimize programming and/or processing of the NVSM control module 32.

The encryption module 48 encrypts the DDSs received from the DDS generating module 46. The encryption may include one or more public and private keys. The encryption may also include one or more keys that are specific to the NVSM drive 34 or a component of the NVSM drive 34, such as a key specific to the NVSM control module 32 and/or the NVSM 34.

The ECC module 50 may use one or more ECC methods to prevent errors when writing data to and reading data from the NVSM 34. Parity bits may be generated and added to the DDSs prior to being stored in the NVSM 34 and/or may be stored separate from the DDSs in the NVSM 34.

The ECC module 50 may store the DDSs at physical block addresses (PBAs) in the NVSM 34. The PBAs may be stored in memory 52 of the NVSM control module 32 or in the NVSM 34. The memory 52 may store a LBA-to-PBA table 54 relating LBAs to PBAs. The LBA-to-PBA table 54 may be accessed by any of the modules in the receive and transmit paths 40, 42.

The transmit path 42 includes an error correction decoding module 60, a decryption module 62, a HDS generating module 64, and a decompression module 66. The error correction decoding module 60 decodes DDSs accessed from the NVSM 34 based on data request signals and/or parity information associated with the DDSs. The data request signals may include one or more PBAs. The data request signals may be generated by the NVSM control module 32 and based on LBAs and/or data request signals received from the host 12.

The decryption module 62 decrypts decoded DDSs from the error correction decoding module 60. The keys used by the encryption module 48 may be shared, accessed and/or generated by the decryption module 62.

The HDS generating module 64 generates one or more HDSs based on decrypted DDSs received from the decryption module 62. The HDS generating module 64 generates the HDSs based on the HDS identification information and/or a data request signal. The data request signal may include one or more LBAs.

Figure 3:
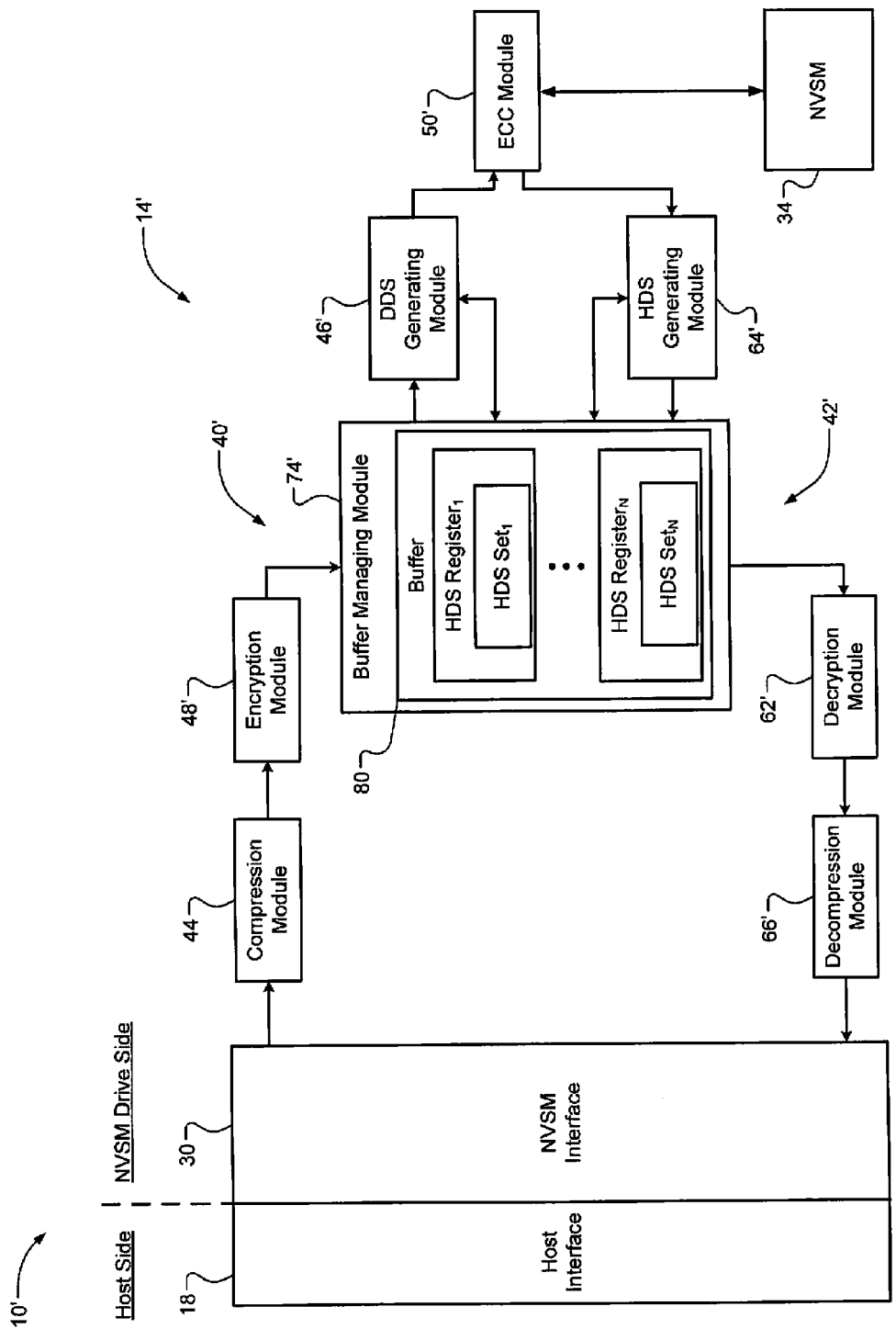
FIG. 3 is a functional block diagram of another implementation of the NVSM storage system of FIG. 1 with pre-buffer compression according to the present disclosure.
Figure 6:
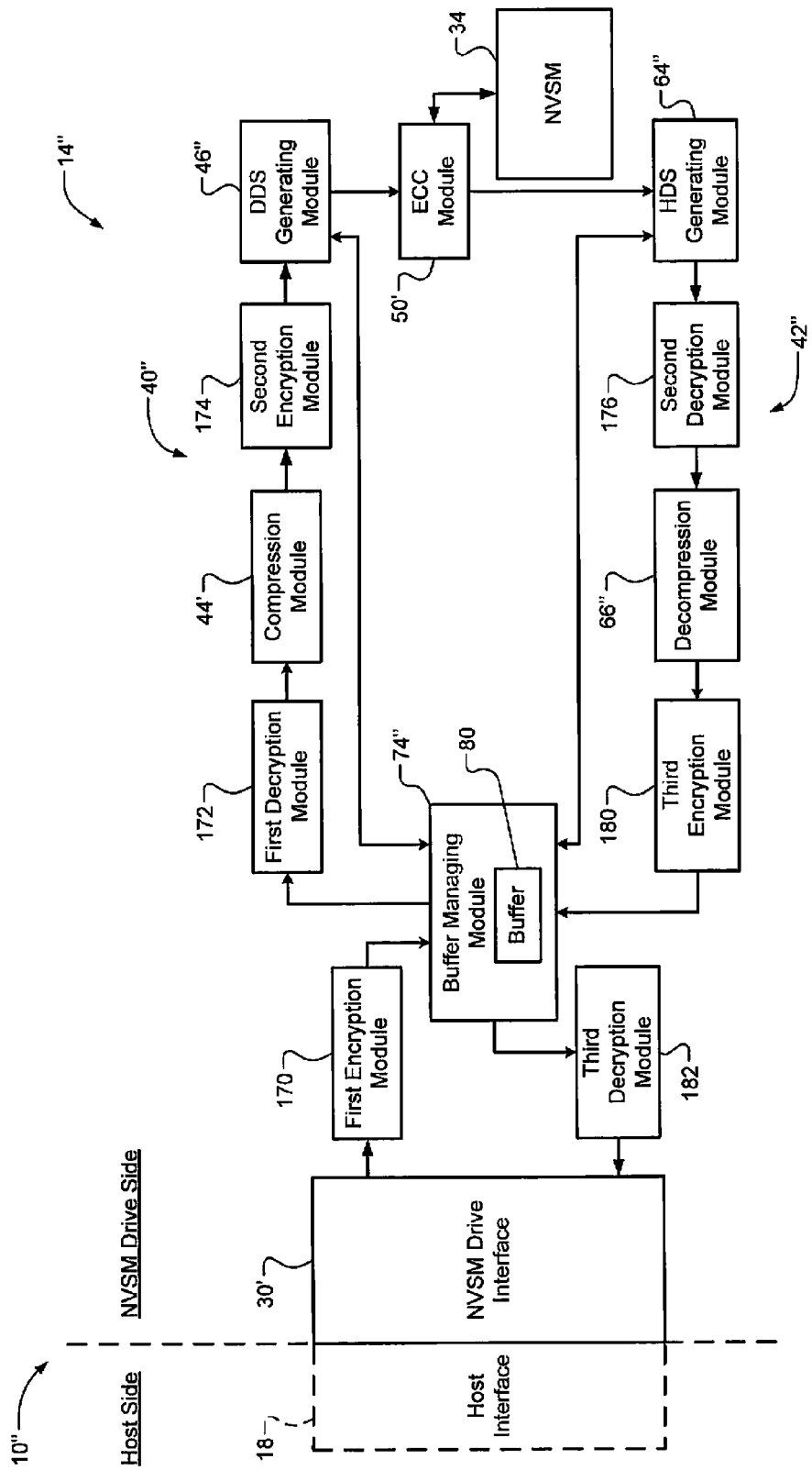
FIG. 6 is a functional block diagram of still another implementation of the NVSM storage system of FIG. 1 with post-buffer compression according to the present disclosure.

Although the modules of the receive and transmit paths 40, 42 are shown in a particular order, they may be rearranged in a different order. For example, the encryption module 48 may be located upstream from the compression module 44. In other words, the encryption module 48 may be connected between the NVSM drive interface 30 and the compression module 44. As another example, the decryption module 62 may be connected between the NVSM drive interface 30 and the decompression module 66. Other examples are shown in FIGS. 3 and 6.

Figure 2:
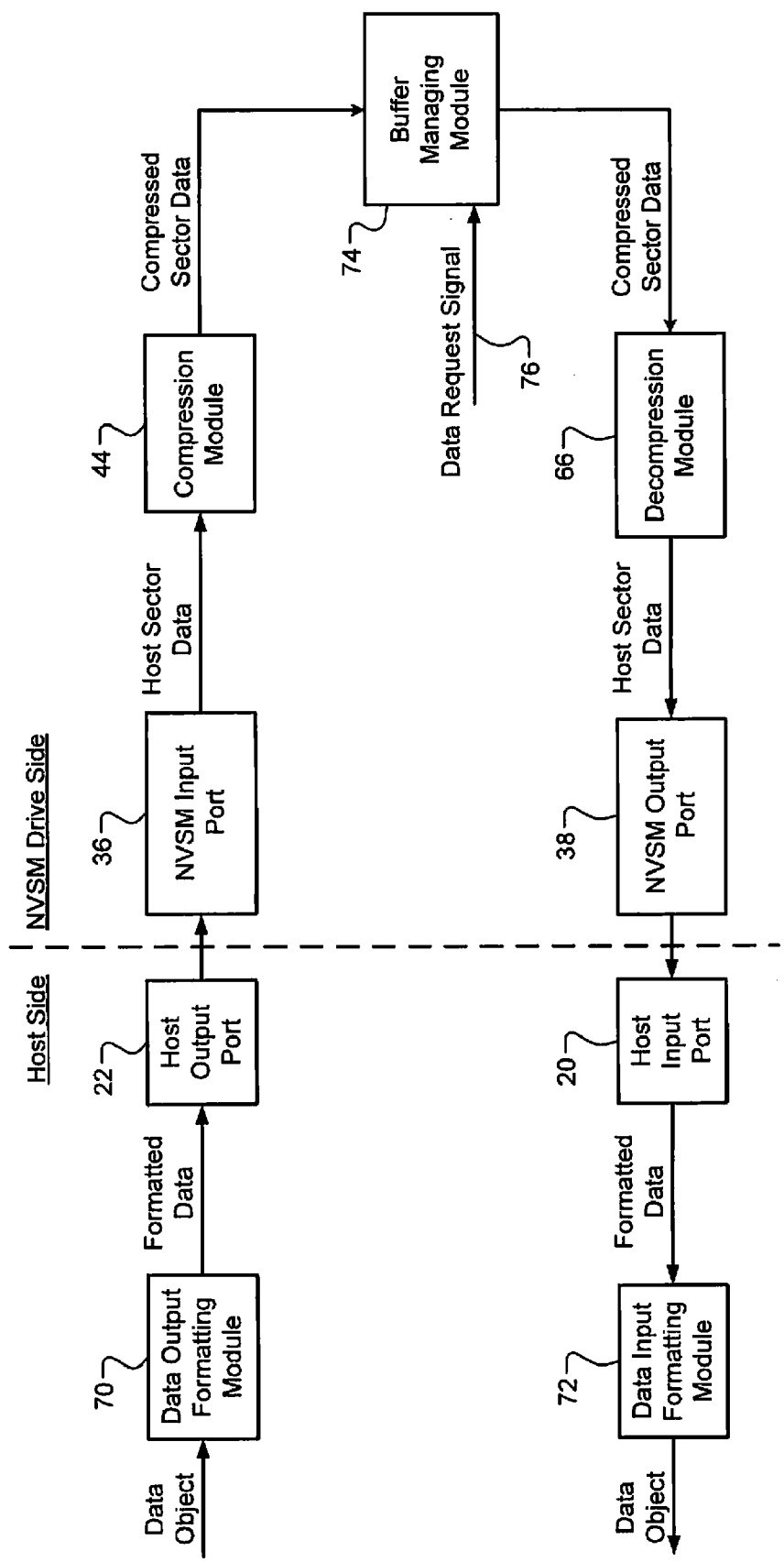
FIG. 2 is a functional block diagram of a portion of the NVSM storage system of FIG. 1 illustrating host data sector (HDS) level compression according to the present disclosure.

Referring now also to FIG. 2, a portion of the NVSM storage system 10 illustrating HDS level compression is shown. The NVSM storage system 10 includes a host side and a NVSM side. The host 12 may include a data output formatting module 70 and a data input formatting module 72. The data output formatting module 70 may generate HDSs based on a received data object. The HDSs are transmitted from the host 12 via the host output port 22 to the NVSM drive 14. The HDSs may be received from the NVSM drive 14 via the host input port 20 and converted to the data object by the data input formatting module 72.

The NVSM drive 14 receives the HDSs via the NVSM input port 36. The HDSs are compressed when possible by the compression module 44 and passed to a buffer managing module 74. Examples of buffer managing module 74 arrangements are shown in FIGS. 3-8. The buffer managing module 74 may collect and store one or more HDSs prior to storage in the NVSM 34. The buffer managing module 74 may convert the HDSs to DDSs prior to storage in the NVSM 34.

The buffer managing module 74 may access and/or request DDSs from the NVSM 34 based on a data request signal 76. The buffer managing module 74 may: convert received DDSs to HDSs when possible; receive HDSs from a component downstream from the buffer managing module 74 (between the buffer managing module 74 and the NVSM 34); and/or transfer HDSs to the decompression module 66. Decompressed HDSs are transmitted to the host via the NVSM output port 38.

The following FIGS. 3-8 illustrate other examples of implementations of the NVSM storage system 10 described with respect to FIGS. 1-2. The examples of implementations are identified respectively as NVSM storage system 10' and 10".

In FIG. 3, the NVSM storage system 10' with pre-buffer compression is shown. The NVSM storage system 10' includes the host interface 18 and a NVSM drive 14'. The modules of the NVSM drive 14' may be referred to as a NVSM storage system. The NVSM drive 14' includes a receive path 40' and a transmit path 42'. The receive path 40' include the compression module 44, an encryption module 48', a buffer managing module 74', and a DDS generating module 46'. The transmit path 42' includes a HDS generating module 64', the buffer managing module 74', a decryption module 62' and a decompression module 66'. The buffer managing module 74' and the DDS and HDS generating modules 46', 64' may be combined to form a single module.

The compression module 44 compresses HDSs received from the host interface 18 before being received by the buffer managing module 74'. The compression is performed on HDSs that are the same length as the HDSs received from the host interface 18. The encryption module 48' encrypts the compressed HDSs. The buffer managing module 74' stores the HDSs in a buffer 80 and forwards the HDSs to the DDS generating module 46'. The buffer 80 may include volatile memory, such as RAM, dynamic RAM (DRAM), and static RAM (SRAM).

The buffer managing module 74' may combine and store the compressed and/or encrypted HDSs in a predetermined order regardless of the order in which the HDSs are received. For example, HDSs may be received in a numerical order or may be received in a different order. Sequentially received HDSs may be stored in different HDS registers to allow for reordering of the HDSs in a numerical or predetermined order. Thus, multiple HDS registers may be used to provide HDS sets for respective DDSs (HDS registers 1-N and HDS sets 1-N are shown). As a register is filled and/or a predetermined DDS length limit is met, an HDS set may be released from the buffer managing module 74' and passed to the DDS generating module 46'. A predetermined DDS length limit is met, for example, when no further HDSs can be and/or are to be combined with other HDSs of a current DDS.

The DDS generating module 46' generates DDSs based on the combined and/or stored HDS(s) in the HDS registers and based on HDS and DDS information. The HDS and DDS information may be received from the buffer managing module 74'. The HDS and DDS information may include the HDS information bits and DDS information, such as DDS length, DDS bit slot availability, etc. The DDSs may be generated to have uniform length.

The DDSs may be error correction encoded by an ECC module 50', as described above with respect to the ECC module 50. The ECC module 50' and/or other ECC modules may be connected: between the compression module 44 and the encryption module 48' to encode compressed HDSs; between the encryption module 48' and the buffer managing module 74' to encode encrypted HDSs; between the buffer managing module 74' and the DDS generating module 46'; and/or between the DDS generating module 46' and the NVSM 34 as shown. The DDSs are then stored in the NVSM 34.

The DDSs may be retrieved from the NVSM 34 by the HDS generating module 64' via the ECC module 50'. The ECC module 50' error correction decodes the DDSs. The HDS generating module 64' accesses the DDSs based on data request signals received, for example, from the buffer managing module 74'.

The HDS generating module 64' and/or the buffer managing module 74' separate the received DDSs into HDSs based on data request signals received from the host interface 18. The data request signals may be received via the compression and encryption modules 44, 48'. As an alternative, the data request signals may be provided directly from the host interface 18 to the HDS generating module 64' via the NVSM drive interface 30. As another alternative, the data request signals may be received by the buffer managing module 74' from the NVSM drive interface 30.

Modules and devices between the NVSM drive interface 30 and the buffer managing module 74' are located on the host side of the buffer managing module 74'. Modules and devices downstream of the buffer managing module 74' are located on the NVSM side of the buffer managing module 74'.

The NVSM drive interface 30 may receive a single data stream or multiple concurrent parallel data steams from the host interface 18. The data streams may be transferred to the compression module 44. Multiple concurrent parallel data streams may be received when the host and NVSM interfaces 18, 30 are, for example, SAS interfaces.

Figure 4:
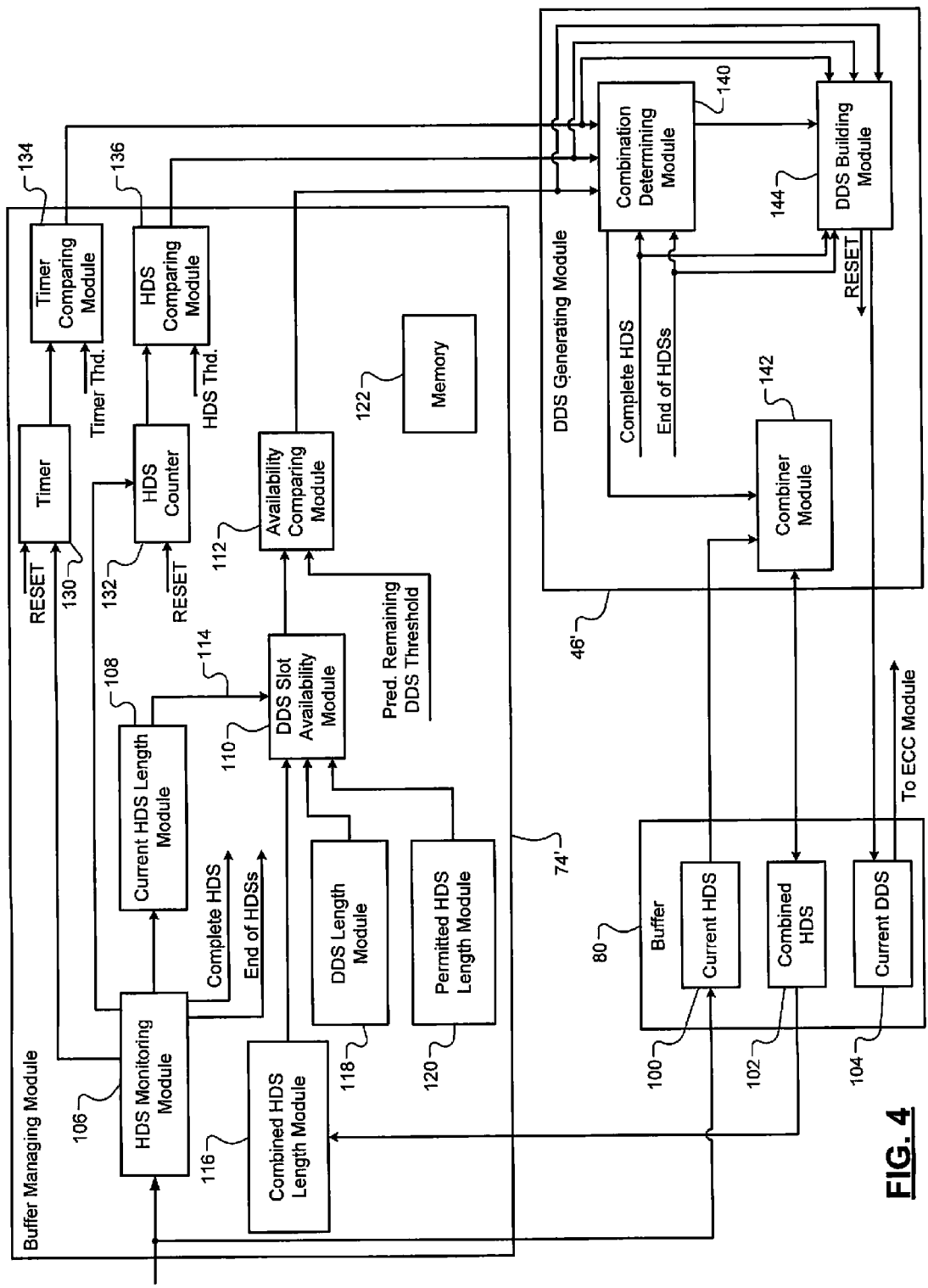
FIG. 4 is a functional block diagram of a buffer managing module and a drive data sector (DDS) generating module of the NVSM storage system of FIG. 3.

Referring now also to FIG. 4, the buffer managing module 74' and the DDS generating module 46' are shown. The buffer managing module 74' and the DDS generating module 46' are shown as one implementation and include various modules. One or more of the modules of the buffer managing module 74' and the DDS generating module 46' may not be included.

The buffer managing module 74' and the DDS generating module 46' may store current HDSs, combined HDSs, and/or current DDSs in respective current HDS registers 100, combined HDS registers 102 and current DDS registers 104 of the buffer 80. A current HDS refers to a HDS currently received by the buffer managing module 74'. A current DDS refers to a DDS that is currently being generated by the buffer managing module 74' and/or the DDS generating module 46'.

The buffer managing module 74' includes a HDS monitoring module 106, a current HDS length determining module 108, a DDS slot availability module 110 and an availability comparing module 112. The HDS monitoring module 106 monitors received compressed and/or encrypted HDSs. The HDS monitoring module 106 may store currently received HDSs in the buffer 80 or the HDSs may be stored directly in the buffer 80, as shown. The HDS monitoring module 106 may determine whether a received HDS is a complete HDS and/or a last HDS in a series of HDSs (end of HDSs).

A complete HDS and a last HDS may be identified based on information attached to the HDS and/or based on a determined length of the HDS. For example, an incomplete HDS may be detected when the HDS has a length that is less than a predetermined minimum length. An incomplete HDS may also be detected when the HDS includes an "incomplete" bit. As another example, a last HDS may be detected based on, for example, an "end" bit attached to the last HDS. As yet another example, a last HDS may be detected when the length of the HDS is greater than a predetermined maximum length. The HDS monitoring module 106 may generate complete HDS and end of HDSs signals based on the stated detections. The complete HDS signal may be HIGH when a complete HDS for a current DDS is detected. The end of HDSs signal may be HIGH when an end of HDSs for a current DDS is detected.

The current HDS length module 108 receives the compressed and/or encrypted HDSs from the HDS monitoring module 106. The current HDS length module 108 determines length of the HDSs and generates HDS length signals 114.

The DDS slot availability module 110 determines available bit slots based on the current HDS length, a combined HDS length, a predetermined DDS length, and/or a permitted HDS length. A bit slot may refer to a portion of a DDS to be generated that has not been assigned and/or accounted for by a HDS bit. For example only, a DDS to be generated may have a predetermined DDS length of 4 KB (4,096 bytes), where a byte includes 8 bits. In other words, the DDS has 4,096 byte locations (byte slots) available. If a first compressed and/or encrypted HDS has 512 B, there are a maximum of 3,584 byte locations available. A smaller amount of byte locations may be available, for example, due to the addition of HDS identification bits and LBAs.

The combined HDS length, the predetermined DDS length, and the permitted HDS length may be determined respectively by a combined HDS length module 116, a DDS length module 118, and a permitted length module 120. The combined HDS length, the predetermined DDS length, and the permitted HDS length may be stored in memory 122 of the buffer managing module 74'.

The availability comparing module 112 determines whether there are enough available byte slots for an additional HDS within a current DDS. The availability comparing module 112 compares the available slots to a predetermined availability threshold. The predetermined availability threshold may be, for example, 256 B, 512 B, etc. Output of the availability comparing module 112 may be HIGH when the available byte slots is less than or equal to the predetermined availability threshold. The predetermined availability threshold may be stored in the memory 122.

The buffer managing module 74' may also include a timer 130, a HDS counter 132, a timer comparing module 134, and a HDS comparing module 136. The timer 130 and the timer comparing module 134 may be used to signal the DDS generating module 46' when a predetermined period has lapsed. Time from reception of a first HDS of a DDS by the HDS monitoring module 106 is measured and compared with the predetermined period. The timer 130 may be initiated when the first HDS is received by the HDS monitoring module 106. The timer comparing module 134 compares lapsed time of the timer to a predetermined time threshold. Output of the timer comparing module 134 may be HIGH when the lapsed time is less than or equal to the predetermined time threshold.

The HDS counter 132 and the HDS comparing module 136 may be used to signal the DDS generating module 46' when the number of HDSs received for a DDS is greater than a predetermined HDS threshold. Value of the HDS counter 132 (HDS counter value) may be set to 1 when a first HDS of a DDS is received. The HDS counter value may be equal to the number of HDSs stored in the buffer 80 for a current DDS plus 1 (for the current HDS received). Output of the HDS comparing module 136 may be HIGH when the HDS counter value is less than or equal to the predetermined HDS threshold. This may limit the number of HDSs stored as part of a single DDS.

The DDS generating module 46' includes a combination determining module 140, a combiner module 142, and a DDS building module 144. The combination determining module 140 determines whether a current HDS stored in the buffer 80 is to be combined with one or more HDSs stored in the combined HDS registers 102. The combination determining module 140 may combine the current HDS with other HDSs when outputs of the availability comparing module 112, the timer comparing module 134, and the HDS comparing module 136 are HIGH. The combination determining module 140 may not combine the current HDS with other HDSs when one or more of the outputs of the availability comparing module 112, the timer comparing module 134, and the HDS comparing module 136 are LOW.

The combination determining module 140 may also combine the current HDS with other HDSs based on the complete HDS and end of HDSs signals. For example, the combination determining module 140 may combine the HDSs when either one of the complete HDS and end of HDS signals are HIGH.

The combiner module 142 may combine a current HDS stored in the current HDS registers 100 with HDSs stored in one of the combined HDS registers 102. This combination may be performed based on a combine signal outputted by the combination determining module 140. The combiner module 142 may concatenate the HDSs, as shown in, for example, FIGS. 11 and 12.

The DDS building module 144 may build the current DDS based on a build signal from the combination determining module 140. The build signal may be generated based on the outputs from the availability comparing module 112, the timer comparing module 134, the HDS comparing module 136 and the complete HDS and end of HDS signals. In one implementation, the DDS building module 144 receives the outputs and the complete HDS and end of HDS signals. The DDS building module 144 determines whether to build the current DDS and store the current DDS in the current DDS registers 104. This determination is based on the outputs and the complete HDS and end of HDS signals. The current DDS may then be accessed by, for example, an ECC module, such as the ECC module 50'.

The DDS building module 144 may generate a reset signal RESET when a current DDS is generated. The rest signal RESET may be used, for example, to reset the timer 130 and the HDS counter 132.

Figure 5:
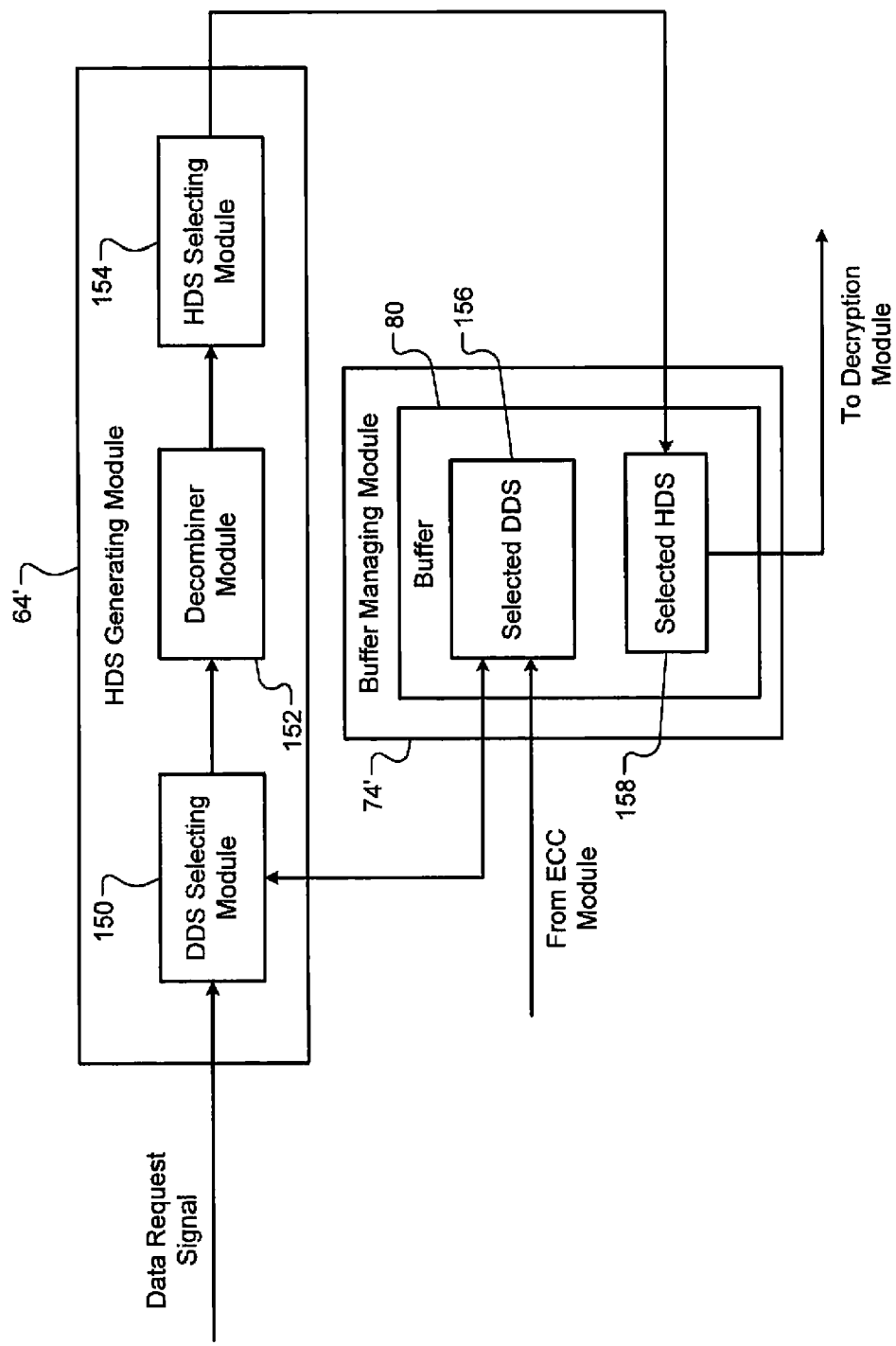
FIG. 5 is a functional block diagram of an HDS generating module of the NVSM storage system of FIG. 3.

Referring now also to FIG. 5, the HDS generating module 64' is shown. The HDS generating module 64' includes a DDS selecting module 150, a decombiner module 152 and a HDS selecting module 154. The DDS selecting module 150 selects a DDS stored in the NVSM 34 based on a data request signal. The selected DDS is provided to the buffer managing module 74' and stored in a selected DDS register 156 of the buffer 80. The selected DDS may be provided by the ECC module 50' and may be provided to the DDS selecting module 150 and/or to the decombiner module 152.

The decombiner module 152 separates the DDS into HDSs. The HDS selecting module 154 selects one or more of the HDSs to transmit to a host interface 18. The HDSs may be selected based on matching LBAs in the data request signal and LBAs stored with the HDSs as part of the selected DDS. The HDS selecting module 154 stores the selected HDSs in a selected HDS register 158 of the buffer 80. The selected HDSs may be accessed from the buffer 80 by, for example, the decryption module 62'.

In FIG. 6, the NVSM storage system 10" with post-buffer compression is shown. The NVSM storage system 10" includes a NVSM drive 14" and the host interface 18. The modules of the NVSM drive 14" may be referred to as a NVSM storage system 10". The NVSM drive 14" includes a receive path 40" and a transmit path 42". The receive path 40" includes a first encryption module 170, a buffer managing module 74", a first decryption module 172, a compression module 44', a second encryption module 174, and a DDS generating module 46". The transmit path 42" includes a HDS generating module 64", a second decryption module 176, a decompression module 66", a third encryption module 180, the buffer managing module 74" and a third decryption module 182. The buffer managing module 74" and the DDS and HDS generating modules 46", 64" may be combined to form a single module.

The first encryption module 170 encrypts HDSs received from the NVSM drive interface 30'. The buffer managing module 74" stores the encrypted HDSs in a buffer prior to passing the encrypted HDSs to the first decryption module 172. The buffer managing module 74" may combine and store the encrypted HDSs in a predetermined order regardless of the order in which the HDSs are received. Sequentially received HDSs may be stored in different HDS registers to allow for reordering of the HDSs in a numerical or predetermined order. Thus, multiple HDS registers may be used to provide HDS sets for respective DDSs. As a HDS register is filled and/or a predetermined DDS length limit is met, a HDS set may be released from the buffer managing module 74". The HDS set is passed to the first decryption module 172.

The first decryption module 172 decrypts the HDSs prior to being compressed if possible by the compression module 44'. The decrypted HDSs may have uniform lengths prior to compression.

The second encryption module 174 encrypts the compressed HDSs. The DDS generating module 46" generates DDSs based on received encrypted HDSs from the second encryption module 174 and communication with the buffer managing module 74". The communication may include, for example, data request signals. The DDS generating module 46" may forward the DDSs to the ECC module 50' prior to storage in the NVSM 34. The ECC module 50' and/or other ECC modules may be connected upstream of the DDS generating module 46", for example, between any two of the modules or may be connected downstream from the DDS generating module 46", as shown.

The DDS generating module 46" may combine the encrypted HDSs in a predetermined order regardless of the order in which the HDSs are received by the DDS generating module 46". Sequentially received HDSs may be combined in different HDS registers to allow for reordering of the HDSs in a numerical or predetermined order. Thus, multiple HDS registers may be used to provide HDS sets for respective DDSs. As a HDS register is filled and/or a predetermined DDS length limit is met, a HDS set may be combined to generate a DDS.

The DDSs may be accessed from the NVSM 34 by the HDS generating module 64" via the ECC module 50'. The ECC module 50' may error correction decode the DDSs prior to reception by the HDS generating module 64". The HDS generating module 64" may access the DDSs based on data request signals received, for example, from the buffer managing module 74".

The HDS generating module 64" and/or the buffer managing module 74" may separate the received DDSs into HDSs based on data request signals received from the host interface 18. The data request signals from the host interface 18 may be directly provided to the buffer managing module 74" and/or to the HDS generating module 64". The data request signals may be directly provided from the NVSM drive interface 30' and not via the first encryption module 170.

The second decryption module 176 decrypts the selected HDSs and provides the decrypted HDSs to the decompression module 66". The decompression module 66" decompresses the decrypted HDSs. The third encryption module 180 encrypts the decompressed HDSs prior to being stored in the buffer 80.

The buffer managing module 74" forwards the encrypted HDSs received by the third encryption module 180 when selected by the HDS generating module 64". The buffer managing module 74" may select one or more of the encrypted HDSs received by the third encryption module 180 when the selection is not performed by the HDS generating module 64". The selection may again be based on LBAs of the encrypted HDSs. The third decryption module 182 decrypts the encrypted HDS(s) received from the buffer managing module 74".

Modules between the NVSM drive interface 30' and the buffer managing module 74" are located on the host side of the buffer managing module 74". Modules and devices downstream of the buffer managing module 74" are located on the NVSM side of the buffer managing module 74".

The NVSM drive interface 30' may receive a single data stream or multiple concurrent parallel data steams from the host interface 18. The data streams may be transferred to the first encryption module 170.

Figure 7:
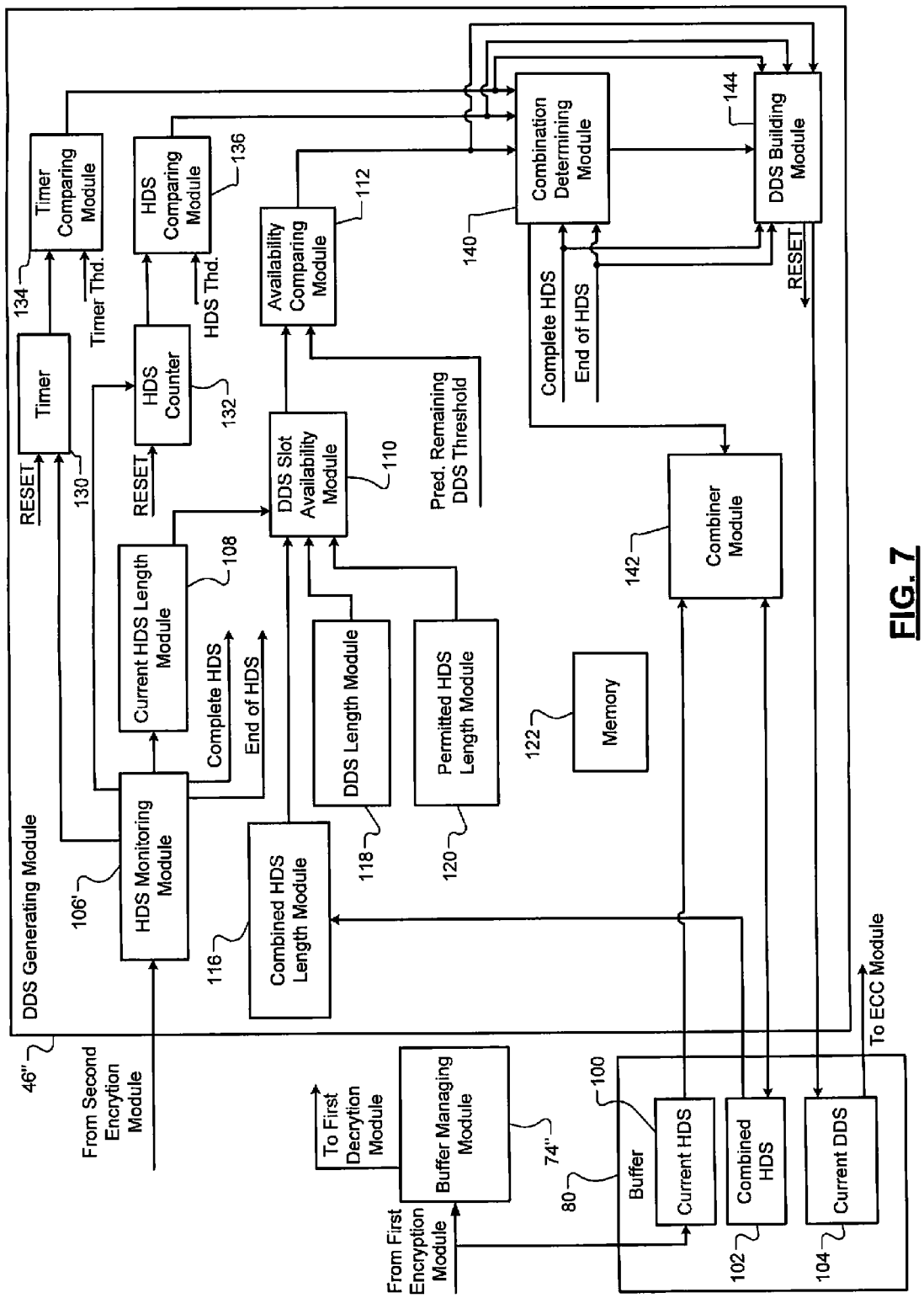
FIG. 7 is a functional block diagram of a buffer managing module and a DDS generating module of the NVSM storage system of FIG. 6.

Referring now also to FIG. 7, the buffer managing module 74" and the DDS generating module 46" of the NVSM storage system 10" are shown. The DDS generating module 46" include modules that are similar to and/or perform the same as the modules of the buffer managing module 74" and the DDS generating module 46" of FIG. 4.

The buffer managing module 74" and the DDS generating module 46" are shown as one implementation. One or more of the modules of the DDS generating module 46" may not be included. The buffer managing module 74" and the DDS generating module 46" store current HDSs, combined HDSs and/or current DDSs in the respective current HDS, combined HDS and current DDS registers 100-104.

The DDS generating module 46" includes a HDS monitoring module 64", the current HDS length module 108, the DDS slot availability module 110 and the availability comparing module 112. The HDS monitoring module 64" monitors received compressed and encrypted HDSs from the second encryption module 176. The HDS monitoring module 64" may determine whether a received HDS is a complete HDS and/or a last HDS in a series of HDSs (end of HDSs), as described above with respect to the implementation of FIG. 4. The HDS monitoring module 64" may generate complete HDS and end of HDSs signals based on the stated determinations.

The current HDS length module 108 receives the compressed and/or encrypted HDSs from the HDS monitoring module 64". The current HDS length module 108 determines length of the HDSs and generates HDS length signals.

The DDS slot availability module 110 determines available bit slots based on the current HDS length, a combined HDS length, a predetermined DDS length, and/or a permitted HDS length. The combined HDS length, the DDS length, and the permitted HDS length may be determined respectively by the length modules 116, 118, 120. The combined HDS length, the predetermined DDS length, and the permitted HDS length may be stored in the memory 122.

The DDS generating module 46" may also include the timer 130, the HDS counter 132, the timer comparing module 134, the HDS comparing module 136, the combination determining module 140, the combiner module 142 and the DDS building module 144.

The combination determining module 140 may combine the current HDS with other HDSs when outputs of the availability comparing module 112, the timer comparing module 134, and the HDS comparing module 64" are HIGH. The combination determining module 140 may not combine the current HDS with other HDSs when one or more of the outputs of the availability comparing module 112, the timer comparing module 134, and the HDS comparing module 136 are LOW.

The combination determining module 140 may also combine the current HDS with other HDSs based on the complete HDS and end of HDSs signals. For example, the combination determining module 140 may combine the HDSs when either one of the complete HDS and end of HDS signals are HIGH.

The DDS building module 144 may build the current DDS based on: a build signal from the combination determining module 140; outputs from the availability comparing module 112, the timer comparing module 134, and the HDS comparing module 64"; and/or the complete HDS and end of HDS signals. The current DDS may than be accessed by, for example, the ECC module 50'.

Figure 8:
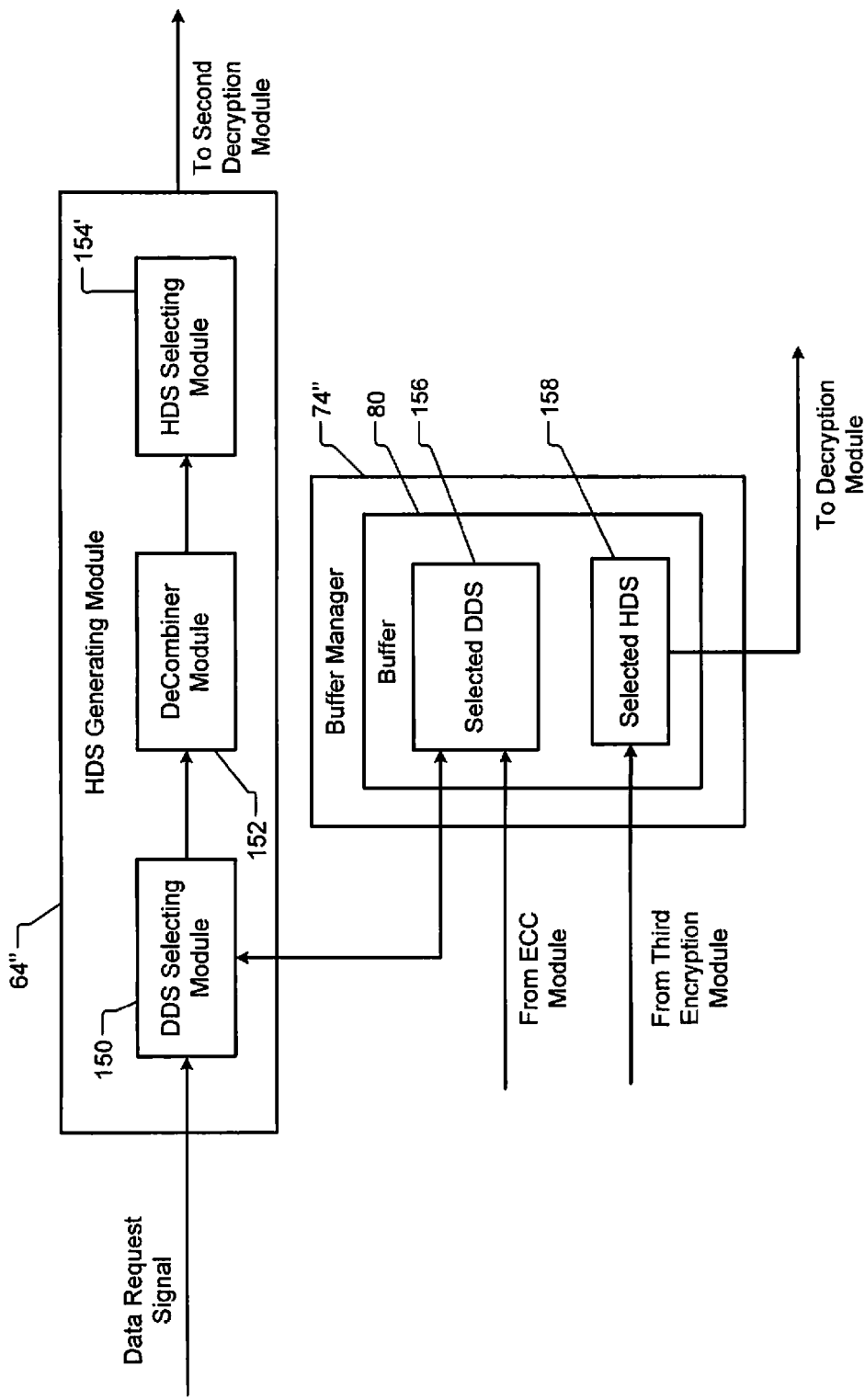
FIG. 8 is a functional block diagram of an HDS generating module of the NVSM storage system of FIG. 6.

Referring now also to FIG. 8, the HDS generating module 64" is shown. The HDS generating module 64" includes the DDS selecting module 150, the decombiner module 152 and a HDS selecting module 154'. The DDS selecting module 150 selects a DDS stored in NVSM 34 based on a data request signal. The HDS selecting module 154' may access the DDSs based on a data request signal received from the buffer managing module 74'. The selected DDS is provided to the buffer managing module 74" and stored in the selected DDS register 156. The selected DDS may be provided by the ECC module 50' and to the DDS selecting module 150 and/or to the decombiner module 152.

The decombiner module 152 separates the DDS into HDSs. The HDS selecting module 154' selects one or more of the HDSs to transmit to the host interface 18. The HDSs may be selected based on matching LBAs in the data request signal and LBAs stored with the HDSs as part of the selected DDS. The HDS selecting module 154' transfers the selected HDSs to the second decryption module 176. The selected HDSs may be stored in the selected HDS register 158. This storage may occur after the decompression and encryption performed by the decompression module 66" and the third encryption module 180. The selected HDSs may be accessed from the buffer 80 by, for example, the third decryption module 180.

The implementations of FIGS. 3 and 6 assure that data (HDSs) are encrypted before being stored in the buffer 80 of the buffer managing modules 74', 74". This protects the data that is received and stored in and/or by the buffer managing modules 74', 74".

Figure 9:
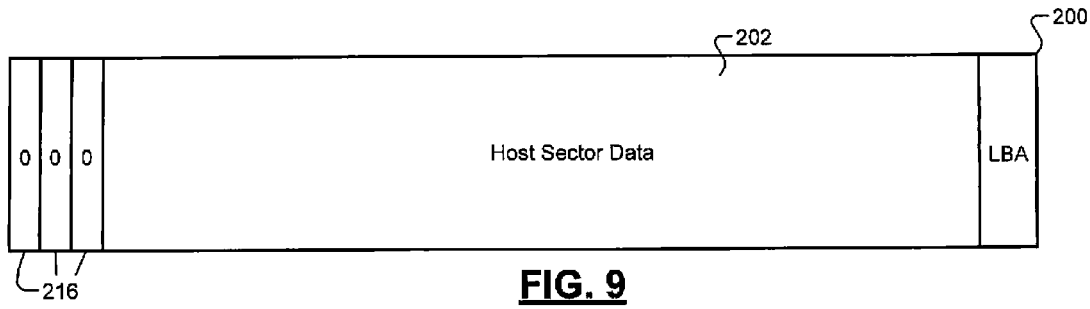
FIG. 9 is a first example of a DDS format for an uncompressed HDS according to the present disclosure.
Figure 10:
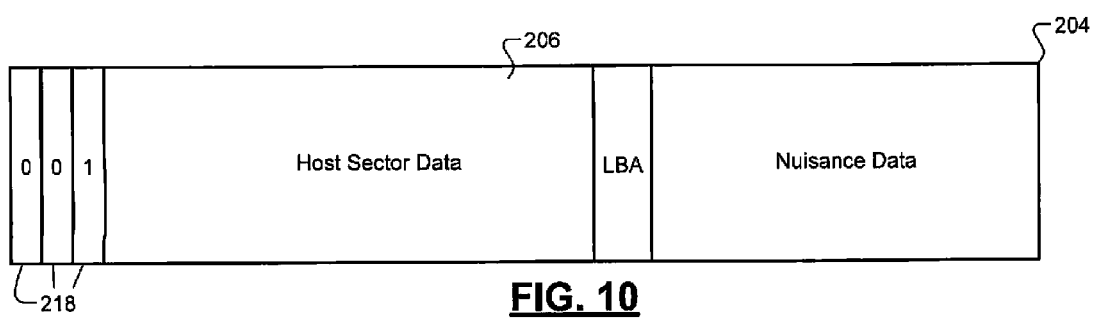
FIG. 10 is a second example of a DDS format for a compressed HDS according to the present disclosure.
Figure 11:
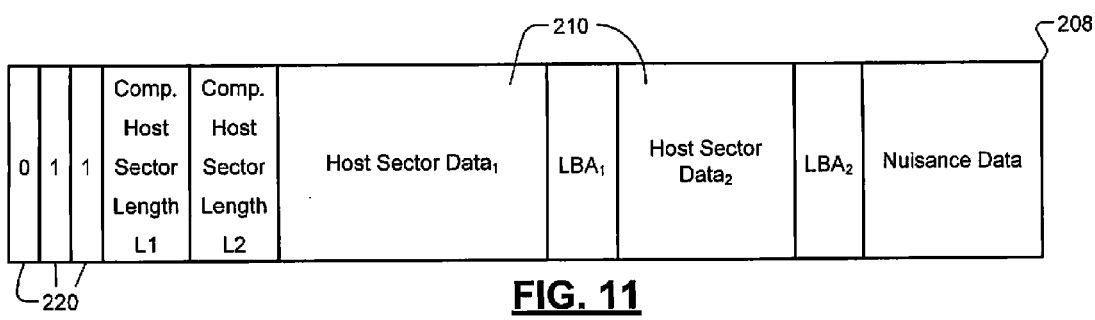
FIG. 11 is a third example of a DDS format for two compressed HDSs according to the present disclosure.
Figure 12:
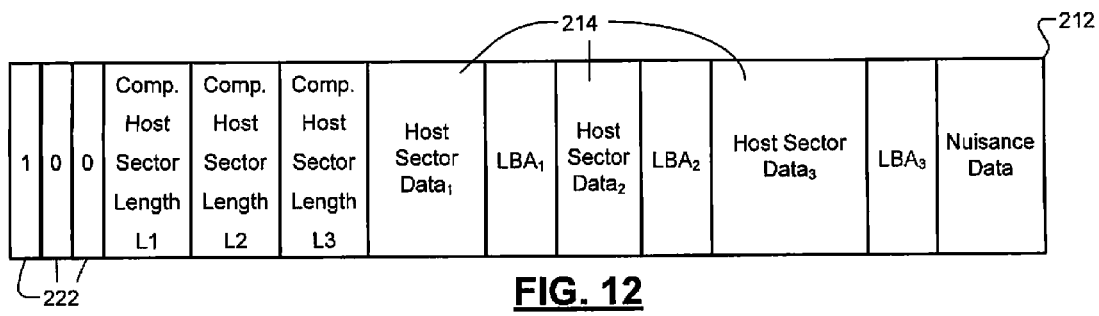
FIG. 12 is a fourth example of a DDS format for three compressed HDSs according to the present disclosure.

In FIGS. 9-12, examples of DDS formats are shown. The DDS format of FIG. 9 illustrates a DDS 200 that includes a single uncompressed HDS 202. The DDS format of FIG. 10 illustrates a DDS 204 that includes a compressed HDS 206. The DDS format of FIG. 11 illustrates a DDS 208 that includes two compressed HDSs 210. The DDS format of FIG. 12 illustrates a DDS 212 that includes three compressed HDSs 214.

A DDS may include indicator fields, such as HDS identification bits. The HDS identification bits are used to recover HDSs from stored DDSs. The HDS identification bits may include bits that indicate: whether a DDS includes compressed and/or uncompressed HDSs; and the number of HDSs with a single DDS. For example, the DDSs 200, 204, 208, 212 of FIGS. 9-12 include 3 HDS identification bits 216, 218, 220, 222. The HDS identification bit series "000" of the DDS 200 indicates that the DDS 200 has single uncompressed HDS. The HDS identification bit series "001" of the DDS 204 indicates that the DDS 204 has a single compressed HDS. The HDS identification bit series "011" of the DDS 208 indicates that the DDS 208 has two compressed HDSs. The HDS identification bit series "100" of the DDS 212 indicates that the DDS 212 has three HDSs.

The HDSs 202, 206, 210, 214 may have different bit lengths as shown. The HDSs 202, 206, 210, 214 may have different lengths due to compression and/or due to reception of different length HDSs and/or partial HDSs from a host. A NVSM drive may generate and store one or more of the DDSs 200, 204, 208, 212. Although the DDSs 200, 204, 208, 212 are shown with a particular number of HDSs, the DDSs 200, 204, 208, 212 may have any number of HDSs.

DDSs may include nuisance data (bits) as shown in FIGS. 10-12. Different amounts of nuisance data may be included based on the length of the corresponding HDSs and a predetermined length of the DDSs. The nuisance data may be added such that the DDSs are the same length, as shown in FIGS. 9-12. The nuisance data may be added to prevent an HDS from being split between two DDSs.

The HDS identification bits may also include length bits that identify the length of the HDSs. The formats of FIGS. 11 and 12 include length bits that identify the lengths of the HDSs 210, 214.

The HDS identification bits may also include LBAs. An LBA may be included and associated with each one of the HDSs. An additional LBA may be included and associated with the combined HDSs of a DDS.

A DDS may have the same length as a HDS. As an example, a DDS that includes only a single HDS, such as the DDS 200, might not include HDS identification bits. The lack of HDS identification bits may be detected by, for example, the HDS generating modules 64', 64" and/or the buffer managing modules 74', 74" of FIGS. 3 and 6. The HDS generating modules 64', 64" and/or the buffer managing modules 74', 74" may determine that a received DDS includes a single uncompressed or compressed HDS when the DDS does not include HDS identification bits.

As an example, HDS identification bits may be included in DDSs that have only a single compressed HDS and HDS identification bits might not be included in a DDS with only a single uncompressed HDS. As another example, HDS identification bits may be included in DDSs that have only a single uncompressed HDS and HDS identification bits may not be included in a DDS with only a single compressed HDS.

Figure 13:
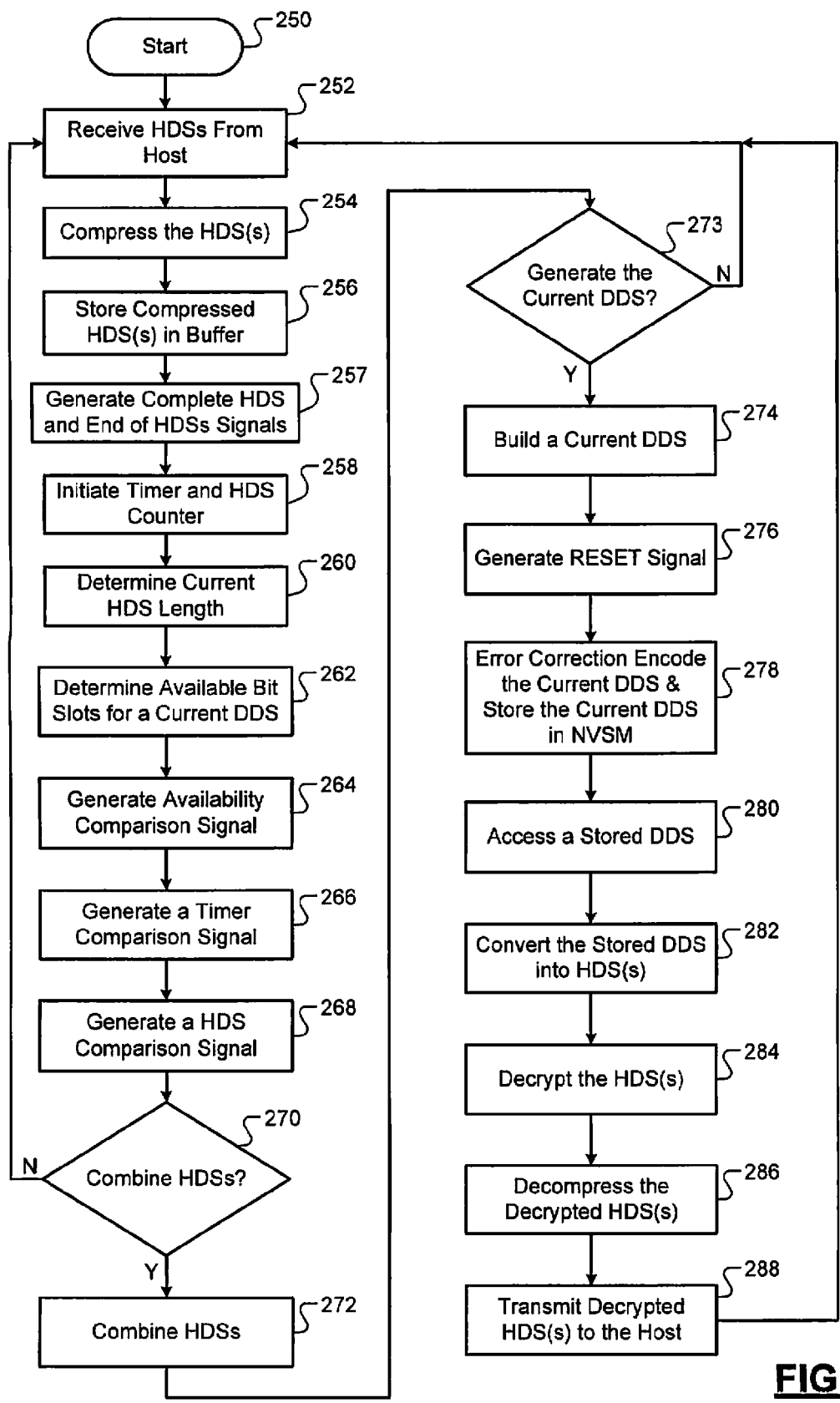
FIG. 13 is a NVSM access method with pre-buffer compression according to the present disclosure.

In FIG. 13, a NVSM access method with pre-buffer compression is shown. Although the following tasks are primarily described with respect to the implementations of FIGS. 3-5, the tasks may be easily modified to apply to other implementations of the present disclosure. The method may begin at 250.

At 252, the compression module 44 receives one or more current HDS(s) from the host interface 18 via the NVSM drive interface 30. For ease of description, processing of a single current HDS is primarily described below. At 254, the compression module 44 compresses and forwards the compressed HDS to the encryption module 48'. The encryption module 48' encrypts the compressed HDS and forwards the encrypted and compressed HDS to the buffer managing module 74'.

At 256, the buffer managing module 74' and/or the HDS monitoring module 106 stores the compressed and encrypted HDS in the current HDS registers 100. At 257, the HDS monitoring module 106 may generate the complete HDS and end of HDSs signals.

At 258, the timer 130 and the HDS counter 132 are initiated by the HDS monitoring module 106 when the current HDS is a first received HDS associated with a DDS to be generated. The HDS counter 132 is incremented when the current HDS is a subsequent HDS that is to be combined with a previously received HDS.

At 260, the current HDS length module 108 determines a current HDS length of the current compressed and encrypted HDS. At 262, the DDS slot availability module 110 determines available bit slots for a current DDS based on the current HDS length, a combined HDS length, a predetermined DDS length, and/or the permitted HDS length. The current HDS length is equal to the combined HDS length when the current HDS is the first HDS of the current DDS.

At 264, the availability comparing module 112 compares the DDS bit slot availability with the predetermined remaining DDS threshold and generates an availability comparison signal. At 266, the timer comparing module 184 compares the output of the timer 130 with the timer threshold and generates a timer comparison signal. At 268, the HDS comparing module 136 compares the HDS counter value with the HDS threshold and generates a HDS comparison signal.

At 270, the combination determining module 140 determines whether to combine the current compressed and encrypted HDS with other HDSs stored in the combined HDS registers 102. The determination may be based on the availability comparison signal, the timer comparison signal, the HDS comparison signal, the complete HDS signal and the end of HDSs signal. The combination determining module 140 generates the combine signal based on the determination. The DDS generating module 46' proceeds to task 272 when the HDSs are combined, otherwise the DDS generating module 46' proceeds to task 252.

At 272, the combiner module 142 combines the current HDS with HDSs in a selected one of the combined HDS registers 102 based on the combine signal. The combine signal may indicate which one of the combined HDS registers 102 to select. After task 272, the DDS generating module 46' may return to task 252. The DDS generating module 46' may alternatively proceed to 273 after combining the HDSs. This may occur, for example, when the combination of a last HDS (previous or current HDS) with the stored HDSs results in the predetermined DDS length limit being met.

At 273, the combination determining module 140 may generate a DDS build signal based on the availability comparison signal, the timer comparison signal, the HDS comparison signal, the complete HDS signal and the end of HDSs signal. The buffer managing module 74' and the DDS generating module 46' may wait for a next HDS when the build signal is LOW. The buffer managing module 74' may return to 252 when the build signal is LOW.

At 274, the DDS building module 144 may build a current DDS based on the build signal and/or based on one or more of the availability comparison signal, the timer comparison signal, the HDS comparison signal, the complete HDS signal and the end of HDSs signal. The DDS building module 144 may build the current DDS when the build signal is HIGH.

At 276, the DDS building module 144 generates a reset signal when the current DDS is generated to reset the timer 130 and the HDS comparing module 136. The buffer managing module 74' may return to 252 when the timer 130 and the HDS comparing module 136 are reset. At 278, the ECC module 50' error correction encodes the current DDS and stores the current DDS in the NVSM 34.

At 280, the HDS generating module 64' and/or the DDS selecting module 150 accesses a DDS (e.g., the current DDS) in the NVSM 34 based on a data request signal. The data request signal may be generated by the buffer managing module 74'. At 282, the decombiner module 152 converts the DDS into one or more HDSs. The HDSs may include LBAs. The HDS selecting module 154 selects one or more of the HDSs for storage in the selected HDS register 158 of the buffer 80. The selection may be based on the LBAs.

At 284, the decryption module 62' decrypts the selected HDSs. At 286, the decompression module 66' decompresses the decrypted HDSs. At 288, the NVSM drive interface 30 transmits the decrypted HDSs to the host interface 18. Tasks 280-288 may be performed independent of and/or without performing tasks 252-278. The NVSM drive interface 30 may return to task 280 after performing task 288.

The above-described tasks 252-288 are meant to be illustrative examples; the tasks at 252-288 may be performed sequentially, synchronously, simultaneously, continuously, during overlapping time periods or in a different order depending upon the application.

Figure 14:
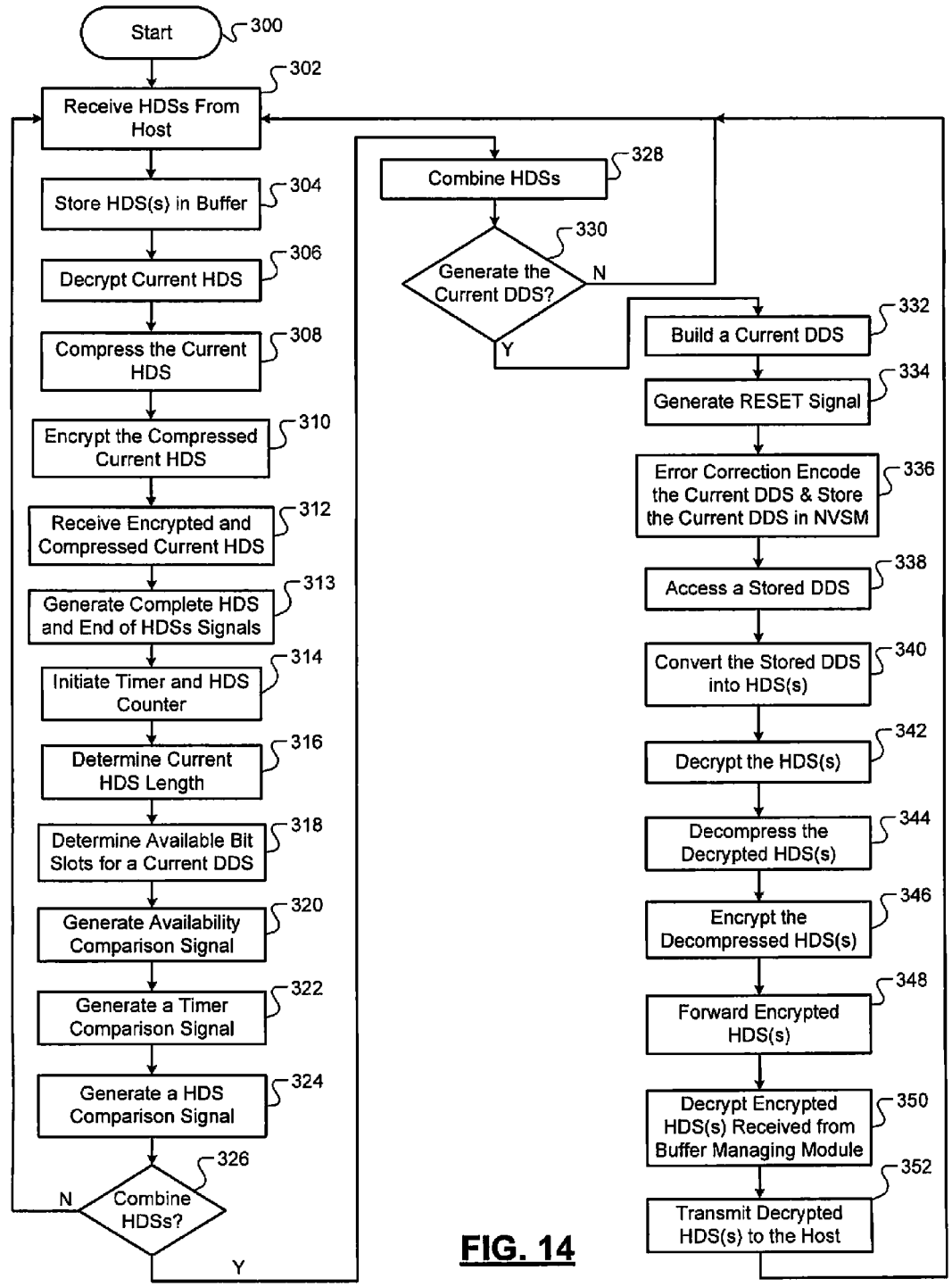
FIG. 14 is a NVSM access method with post-buffer compression according to the present disclosure.

In FIG. 14, a NVSM access method with post-buffer compression is shown. Although the following tasks are primarily described with respect to the implementations of FIGS. 6-8, the tasks may be easily modified to apply to other implementations of the present disclosure. The method may begin at 300.

At 302, the first encryption module 170 receives one or more current HDS(s) from the host interface 18 via the NVSM drive interface 30. For ease of description processing of a single current HDS is primarily described below. The first encryption module 170 encrypts the current HDS.

At 304, the buffer managing module 74" receives and stores the encrypted HDS in one of the current HDS registers of buffer 80. At 306, the first decryption module 172 decrypts the current HDS. At 308, the compression module 44' compresses the current HDS and forwards the compressed HDS to the second encryption module 174.

At 310, the second encryption module 174 encrypts the compressed HDS and forwards the encrypted and compressed HDS to the DDS generating module 46". The second encryption module 174 may used an encryption method that is the same as or different than that of the first encryption module 170. Use of different encryption methods can provide increased levels of security.

At 312, the HDS monitoring module 106' receives the encrypted and compressed HDS. At 313, the HDS monitoring module 106 may generate the complete HDS and end of HDSs signals based on the encrypted and compressed HDS.

At 314, the timer 130 and the HDS counter 132 are initiated by the HDS monitoring module 106' when the current HDS is a first received HDS associated with a DDS to be generated. The HDS counter 132 is incremented when the current HDS is a subsequent HDS that is to be combined with a previously received HDS.

At 316, the current HDS length module 108 determines a current HDS length of the current compressed and encrypted HDS. At 318, the DDS slot availability module 110 determines available bit slots for a current DDS based on the current HDS length, a combined HDS length, a predetermined DDS length, and/or a permitted HDS length. The current HDS length is equal to the combined HDS length when the current HDS is the first HDS of the current DDS.

At 320, the availability comparing module 112 compares the DDS bit slot availability with the predetermined remaining DDS threshold and generates an availability comparison signal. At 322, the timer comparing module 134 compares the output of the timer 130 with the timer threshold and generates a timer comparison signal. At 324, the HDS comparing module 136 compares the HDS counter value with the HDS threshold and generates a HDS comparison signal.

At 326, the combination determining module 140 determines whether to combine the current compressed and encrypted HDS with other HDSs stored in the combined HDS register. The determination may be based on the availability comparison signal, the timer comparison signal, the HDS comparison signal, the complete HDS signal and the end of HDSs signal. The combination determining module 140 generates the combine signal based on the determination. The DDS generating module 46" proceeds to task 328 when the HDSs are combined, otherwise the DDS generating module 46" proceeds to task 330. The DDS generating module 46" may alternatively proceed to task 263 after combining the HDSs. This may occur, for example, when the combination of a last HDS with the stored HDSs results in the predetermined DDS length limit being met.

At 328, the combiner module 142 combines the current HDS with HDSs in a selected one of the combined HDS registers 102 based on the combine signal. The combine signal may indicate which one of the combined HDS registers 102 to select.

At 330, the combination determining module 140 may generate a DDS build signal based on the availability comparison signal, the timer comparison signal, the HDS comparison signal, the complete HDS signal and the end of HDSs signal. The buffer managing module 74" and the DDS generating module 46" may wait for a next HDS when the build signal is LOW. The buffer managing module 46" may return to 302 when the build signal is LOW.

At 332, the DDS building module 144 builds a current DDS based on the build signal and/or based on one or more of the availability comparison signal, the timer comparison signal, the HDS comparison signal, the complete HDS signal and the end of HDSs signal. The DDS building module 144 may build the current DDS when the build signal is HIGH.

At 334, the DDS building module 144 generates a reset signal when the current DDS is generated to reset the timer 130 and the HDS comparing module 136. The buffer managing module 74" may return to 302 when the timer 130 and the HDS comparing module 136 are reset. At 336, the ECC module 50' error correction encodes the current DDS and stores the current DDS in the NVSM 34.

At 338, the HDS generating module 64" and/or the DDS selecting module 150 accesses a DDS (e.g., the current DDS) in the NVSM 34 based on a data request signal. The data request signal may be generated by the buffer managing module 74".

At 340, the decombiner module 152 converts the DDS into one or more HDSs. The HDSs may include LBAs. The HDS selecting module 154' selects one or more of the HDSs and transfers the selected HDSs to the second decryption module 176. The selection may be based on the LBAs and may be performed by the buffer managing module 74" instead of by the HDS generating module 64". The selection may occur subsequent to the decryption, decompression and encryption of 342-346.

At 342, the second decryption module 176 decrypts the selected HDSs. At 344, the decompression module 66"

decompresses the decrypted HDSs. At 346, the third encryption module 180 encrypts the decompressed HDSs prior to being stored in a selected HDS register 158 of the buffer 80. The third encryption module 180 may use the same or different encryption methods used by the first and second encryption modules 170, 174.

At 348, the buffer managing module 74" forwards the encrypted HDSs received by the third encryption module 180 when selected by the HDS generating module 64". The buffer managing module 74" may select one or more of the encrypted HDSs received by the third encryption module 180 when the selection is not performed by the HDS generating module 64". The selection may again be based on LBAs of the encrypted HDSs.

At 350, the third decryption module decrypts the encrypted HDS(s) received from the buffer managing module 74". At 352, the NVSM drive interface 30' transmits the decrypted HDSs received by the third decryption module 182 to the host interface 18. Tasks 338-352 may be performed independent of and/or without performing tasks 302-336. The NVSM drive interface 30 may return to task 338 after performing task 352.

The above-described tasks 302-352 are meant to be illustrative examples; the tasks at 302-352 may be performed sequentially, synchronously, simultaneously, continuously, during overlapping time periods or in a different order depending upon the application.

The above described systems and methods reduce "wear and tear" of a NVSM. The described compression and DDS generating techniques can increase storage capacity of a NVSM while providing reliable read and write events.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A storage system comprising:
a non-volatile semiconductor memory;
a drive interface configured to receive host data sectors from a host interface;
a buffer managing module configured to store the host data sectors in a buffer;
a compression module configured to compress the host data sectors to generate compressed host data sectors, wherein lengths of the compressed host data sectors are different;
a generating module configured to add nuisance data to the compressed host data sectors to generate drive data sectors, wherein the nuisance data comprises (i) all zeros, (ii) all ones, (iii) null states, or (iv) redundant data, and wherein the nuisance data is added to the host data sectors such that the drive data sectors are of a same predetermined length; and
a control module configured to store the drive data sectors in the non-volatile semiconductor memory.

2. The storage system of claim 1, wherein the drive interface and the host interface are selected from a group comprising serial advanced technology attachment interfaces, small computer system interfaces, fiber channel interfaces, and universal serial bus interfaces.

3. The storage system of claim 1, further comprising an encryption module configured to encrypt the received host data sectors or the compressed host data sectors to generate encrypted host data sectors,
wherein the generating module is configured to convert the encrypted host data sectors to the drive data sectors.

4. The storage system of claim 1, further comprising:
an encryption module configured to generate encrypted host data sectors by encypting (i) the received host data sectors, (ii) the compressed host data sectors,
wherein the generating module is configured to generate the drive data sectors by converting the compressed host data sectors or the encrypted host data sectors; and
an error correction encoding module configured to encode the drive data sectors to generate encoded drive data sectors,
wherein the encoded drive data sectors are stored in the non-volatile semiconductor memory.

5. The storage system of claim 1, further comprising:
a first encryption module configured to encrypt the received host data sectors to generate encrypted HDSs prior to the buffer managing module receiving the host data sectors;
a decryption module configured to decrypt the encrypted host data sectors received from the buffer managing module; and
a second encryption module configured to encrypt the compressed host data sectors,
wherein the compression module is configured to, based on decrypted host data sectors received from the decryption module, generate the compressed host data sectors.

6. The storage system of claim 5, further comprising an error correction encoding module, wherein:
the generating module is configured to generate the drive data sectors based on (i) the encrypted host data sectors, and (ii) the compressed host data sectors, wherein the compressed host data sectors are received by the generating module from the second encryption module;
the error correction encoding module is configured to encode the drive data sectors to generate encoded drive data sectors; and
the error correction encoding module is configured to store the encoded drive data sectors in the non-volatile semiconductor memory.

7. The storage system of claim 1, wherein the received host data sectors are uncompressed.

8. The storage system of claim 1, wherein: the host data sectors comprise a first host data sector and a second host data sector;
the buffer managing module or the generating module is configured to determine whether to combine the first host data sector with the second host data sector; and
the generating module is configured to, based on the determination of whether to combine the first host data sector with the second host data sector, combine the first host data sector and the second host data sector to generate one of the drive data sectors.

9. The storage system of claim 1, wherein:
the buffer managing module or the generating module comprises
a timer configured to generate a timer signal based on a time period since a first host data sector, of one of the drive data sectors, is received by the buffer managing module, and
a comparing module configured to (i) compare the timer signal to a threshold, and (ii) generate a comparison signal based on the comparison between the timer signal and the threshold; and
the generating module is configured to generate the one of the drive data sectors based on the comparison signal.

10. The storage system of claim 1, wherein:
the buffer managing module or the generating module comprises
- a counter configured to generate a counter signal based on a number of host data sectors (i) received by the buffer managing module and (ii) combined to generate one of the drive data sectors, and
- a comparing module configured to (i) compare the counter signal to a threshold, and (ii) generate a comparison signal based on the comparison between the counter signal and the threshold; and the generating module is configured to generate the one of the drive data sectors based on the comparison signal.

11. The storage system of claim 1, wherein the generating module comprises:
- a determining module configured to (i) determine whether to combine a current host data sector with stored host data sectors, and (ii) generate a combine signal based on the determination of whether to combine the current host data sector with the stored host data sectors;
- a combiner module configured to, based on the combine signal, combine the current host data sector and the stored host data sectors; and
- a building module configured to build one of the drive data sectors from a combination of the current host data sector and the stored host data sectors.

12. The storage system of claim 11, wherein:
the determining module is configured to, based on (i) a number of available bit slots for the one of the DDSs, (ii) a timer comparison signal, (iii) a comparison signal, and (iv) a complete signal or an end signal, determine whether to combine the current host data sector with the stored host data sectors;
the complete signal indicates a complete host data sector has been received; and
the end signal indicates an end of a series of host data sectors.

13. The storage system of claim 12, further comprising:
- an availability module configured to, based on (i) a length of the current host data sector, and (ii) a length of the one of the drive data sectors, determine the number of available bit slots for the one of the DDSs;
- a timer module configured to generate the timer comparison signal;
- a comparison module configured to generate the comparison signal; and
- a monitoring module configured to generate the complete signal or the end signal.

14. A method of operating a storage system, the method comprising:
- receiving host data sectors from a host interface via a drive interface;
- storing the host data sectors in a buffer;
- compressing the host data sectors to generate compressed host data sectors, wherein lengths of the compressed host data sectors are different;
- adding nuisance data to the compressed host data sectors to generate drive data sectors, wherein the nuisance data comprises (i) all zeros, (ii) all ones, (iii) null states, or (iv) redundant data, and wherein the nuisance data is added to the host data sectors such that the drive data sectors have a same predetermined length; and
- storing the drive data sectors a non-volatile semiconductor memory.

15. The method of claim 14, further comprising compressing the received host data sectors prior to a buffer managing module receiving the host data sectors.

16. The method of claim 14, further comprising compressing the received host data sectors subsequent to a buffer managing module receiving the host data sectors.

17. The method of claim 14, wherein:
the host data sectors comprise a first host data sector and a second host data sector, and
the method further comprises
- determining whether to combine the first host data sector with the second host data sector, and
- based on the determination of whether to combine the first host data sector with the second host data sector, combining the first host data sector and the second host data sector to generate one of the drive data sectors.

18. The method of claim 17, further comprising:
- determining a number of available bit slots for the one of the drive data sectors based on a length of (i) the first host data sector, or (ii) the second host data sector; and
- based on the number of available bit slots for the one of the drive data sectors, combining the first host data sector and the second host data sector.

19. The method of claim 17, further comprising:
- determining a number of available bit slots for the one of the drive data sectors based on (i) a predetermined length of a drive data sector, or (ii) a permitted length of a host data sector; and
- based on the determination of the number of available bit slots for the one of the drive data sectors, combining the first host data sector and the second host data sector.

20. The method of claim 14, further comprising:
- determining whether to combine a current host data sector with stored host data sectors;
- generating a combine signal based on the determination of whether to combine the current host data sector with the stored host data sectors;
- combining the current host data sector and the stored host data sectors based on the combine signal;
- building one of the drive data sectors from a combination of the current host data sector and the stored host data sectors;
- determining whether to combine the current host data sector with the stored host data sectors based on (i) a number of available bit slots for the one of the drive data sectors, (ii) a timer comparison signal, (iii) a host data sector comparison signal, and (iv) a complete signal or an end signal, wherein the complete signal indicates a complete host data sector has been received, and wherein the end signal indicates an end of a series of host data sectors;
- determining the number of available bit slots for the one of the drive data sectors based on (i) a length of the current host data sector, and (ii) a length of the one of the drive data sectors;
- generating the timer comparison signal;
- generating the comparison signal; and
- generating the complete signal or the end signal.

* * * * *